United States Patent
Besik et al.

(10) Patent No.: US 10,782,676 B2
(45) Date of Patent: Sep. 22, 2020

(54) WORK CELL FOR A PRODUCTION ROBOT

(71) Applicant: Benteler Maschinenbau GmbH, Bielefeld (DE)

(72) Inventors: Martin Besik, Jenisvice (CZ); Radovan Kout, Liberec (CZ); Jiri Malý, Smrzovka (CZ); Petr Masilko, Liberec (CZ); Vaclav Sula, Liberec (CZ); Lukas Urban, Liberec (CZ)

(73) Assignee: BENTELER MASCHINENBAU GMBH, Bielefeld (DE)

( * ) Notice: Subject to any disclaimer, the term of this patent is extended or adjusted under 35 U.S.C. 154(b) by 275 days.

(21) Appl. No.: 15/877,028

(22) Filed: Jan. 22, 2018

(65) Prior Publication Data

US 2018/0210424 A1    Jul. 26, 2018

(30) Foreign Application Priority Data

Jan. 23, 2017  (DE) .................. 10 2017 101 203

(51) Int. Cl.
*B23K 9/00* (2006.01)
*G05B 19/418* (2006.01)
(Continued)

(52) U.S. Cl.
CPC ........ *G05B 19/4182* (2013.01); *B23K 9/0953* (2013.01); *B23K 9/1006* (2013.01);
(Continued)

(58) Field of Classification Search
CPC .. B23K 9/0953; B23K 9/0956; B23K 9/1006; B23K 9/16; B23K 9/126; B23K 9/173;
(Continued)

(56) References Cited

U.S. PATENT DOCUMENTS

| | | | |
|---|---|---|---|
| 6,772,932 B1 * | 8/2004 | Halstead ............ | B23K 37/0235 219/125.1 |
| 2006/0108342 A1 | 5/2006 | Samodell et al. | |

(Continued)

FOREIGN PATENT DOCUMENTS

| CN | 104785958 A | 11/2016 |
|---|---|---|
| CN | 205852089 U | 1/2017 |

(Continued)

OTHER PUBLICATIONS

European Search Report dated May 14, 2018 with respect to counterpart European patent application EP 18 15 2523.

(Continued)

*Primary Examiner* — Hung D Nguyen

(74) *Attorney, Agent, or Firm* — Henry M. Feiereisen LLC

(57) ABSTRACT

A modular work cell for a production robot includes a base module, on which at least one production robot is arranged, disposed inside the modular work cell. The modular work cell further includes wall elements, a control cabinet, an access, and a feed unit for workpieces which is arranged between the access and the production robot. The base module, the control cabinet, the feed unit and the access form a mechanically and electrically interconnected transport assembly configured for transport. The wall elements can be transported separate from the transport assembly.

16 Claims, 4 Drawing Sheets

(51) Int. Cl.
  *B23K 31/02*     (2006.01)
  *B23K 37/04*     (2006.01)
  *B25J 21/00*     (2006.01)
  *B25J 9/00*      (2006.01)
  *B23K 37/00*     (2006.01)
  *B23K 37/02*     (2006.01)
  *B23K 9/095*     (2006.01)
  *B23K 9/10*      (2006.01)
  *B25J 9/08*      (2006.01)
  *B23K 9/12*      (2006.01)

(52) U.S. Cl.
  CPC ............ *B23K 31/02* (2013.01); *B23K 37/006* (2013.01); *B23K 37/02* (2013.01); *B23K 37/04* (2013.01); *B23K 37/0443* (2013.01); *B23K 37/0461* (2013.01); *B25J 9/0009* (2013.01); *B25J 9/0096* (2013.01); *B25J 9/08* (2013.01); *B25J 21/00* (2013.01)

(58) Field of Classification Search
  CPC .......... B23K 9/287; B23K 9/32; B23K 9/321; B23K 9/323; B23K 9/324; B23K 37/006; B23K 37/02; B23K 37/0211; B23K 37/0235; B23K 37/04; B23K 37/0443; B23K 37/0461; B23K 37/047; B23K 31/02; B25J 9/0009; B25J 9/0084; B25J 9/0096; B25J 9/08; B25J 21/00; G05B 19/4182
  USPC .... 219/125.1, 136; 228/44.5, 47.1, 48, 49.1, 228/49.2
  See application file for complete search history.

(56) References Cited

U.S. PATENT DOCUMENTS

| | | | |
|---|---|---|---|
| 2007/0235433 A1* | 10/2007 | Osicki | B23K 9/173 219/125.1 |
| 2009/0120920 A1 | 5/2009 | Gurney et al. | |
| 2013/0068756 A1 | 3/2013 | Dörr et al. | |
| 2013/0273486 A1 | 10/2013 | Dvorak et al. | |
| 2015/0170658 A1 | 6/2015 | Kim et al. | |
| 2015/0176758 A1* | 6/2015 | Nicholson | B23P 21/004 219/76.14 |
| 2016/0322742 A1* | 11/2016 | Mayer-Rosa | B23K 9/32 |

FOREIGN PATENT DOCUMENTS

| | | | |
|---|---|---|---|
| DE | 35 32 305 | 3/1987 | |
| DE | 3532305 A1 * | 3/1987 | ............ B23Q 39/04 |
| DE | 42 12 178 A1 | 10/1993 | |
| DE | 202 11 754 U1 | 7/2003 | |
| EP | 1 598 157 | 11/2005 | |
| WO | WO 2007/120438 | 10/2007 | |

OTHER PUBLICATIONS

Translation of European Search Report dated May 14, 2018 with respect to counterpart European patent application EP 18 15 2523.
Chinese Search Report issued on Jul. 7, 2020 with respect to counterpart Chinese patent application 201810062350.9.
Translation of Chinese Search Report issued on Jul. 7, 2020 with respect to counterpart Chinese patent application 201810062350.9.

* cited by examiner

WORK CELL FOR A PRODUCTION ROBOT

CROSS-REFERENCES TO RELATED APPLICATIONS

This application claims the priority of German Patent Application, Serial No. 10 2017 101 203.6, filed Jan. 23, 2017, pursuant to 35 U.S.C. 119(a)-(d), the content of which is incorporated herein by reference in its entirety as if fully set forth herein.

BACKGROUND OF THE INVENTION

The present invention relates to a to a work cell for a production robot, and more specifically to a production robot that can be transported cost-effectively in modular form.

The following discussion of related art is provided to assist the reader in understanding the advantages of the invention, and is not to be construed as an admission that this related art is prior art to this invention.

Many companies that have international presence and operations frequently combine work cells into a modular system which is, for this purpose, sometimes transported across continents. The disassembly, transport and reassembly of a work cell, which as such represents a very complex assembly unit, require a considerable amount of work. The greater the number of parts that have to be dismantled and packed, the greater is also the effort for the packing material. Inevitably, the personnel costs for assembly and disassembly increase significantly with increasing number of components. Especially the de-installation and installation of electrical components is particularly time consuming. Although modular advantages offer in this respect a high degree of flexibility, this flexibility is achieved at the expense of high disassembly and assembly costs.

It would therefore be desirable and advantageous to obviate prior art shortcomings and to optimize the installation costs for constructing a work cell for a production robot and, more particularly, to save costs by virtue of the time savings achieved during disassembly and reassembly of the work cell.

SUMMARY OF THE INVENTION

According to one aspect of the present invention, a work cell according to the invention for a production robot includes, in a known manner, a base module inside the modular work cell. The work cell has wall elements, a control cabinet and an access as well as a feed unit for workpieces arranged between the access and the production robot. The access can also be referred to as a gate, especially when larger workpieces must be transported into the work cell. During transport, the base module with the production robot, the control cabinet, the feed unit and the access form a contiguous and electrically interconnected transport assembly, from which the wall elements can be transported separately.

The work cell according to the invention thus retains the modular basic principle, but with the significant difference that a transport assembly of the components most important for the work cell is not completely disassembled. The transport assembly includes not only the production robot with its basic module, but also the electrically controlled components. The control and supply lines are brought together in a control cabinet.

Rewiring or electrification in the prior art is time-consuming, because energy is supplied via an energy bridge in the upper part of the work cell, as is standard today. Until now, the entire energy bridge had to be disconnected from the work cell, with the result that all electrical lines routed via the energy bridge also must be disconnected from the components to be controlled or supplied with power. The components of the work cell to be controlled via the electrical lines of the energy bridge include at least the access, the feed unit and optionally the production robot. The energy bridge is connected to the control cabinet.

According to the invention, it is provided that the control cabinet, the feed unit, the access and the production robot as a whole form an electrically interconnected transport subassembly, without the need for interrupting the electrical connections for transport. This significantly reduces the disassembly effort, in particular because the access and the feed unit remain connected with the base module of the robot. This not only reduces the electrical uninstallation and installation costs, but also the cost associated with disassembling and assembling the mechanical components. As a result, only those components are separated from the central transport assembly that are not electrified or are located outside the work cell. These are primarily the wall elements which must surround the production robots for reasons of occupational safety. In addition, a control unit for the production robot or for the entire work cell is usually located outside the production cell.

The production robot is preferably a welding robot. In this case, a welding power source is required. When multiple welding robots are located inside a work cell, multiple welding power sources are also required. These can be combined to form a compact module for transport. This module can be coupled to the control cabinet via plug connections. The control cabinet is the electrical interface to the work cell, i.e. both to the control unit and to any welding power sources.

The feed unit in the work cell has the function of conveying the workpiece to be machined, after introduction through the access, to at least one production robot. In particular, the feed unit is a turntable or includes a turntable. The turntable may have a partition wall allowing separation of the work areas of the turntable from one another.

The feed unit bridges the gap between the production robot and the access. The feed unit is equipped with a scanner. The local order of the transport assembly is therefore access→feed unit→production robot→control cabinet. Therefore, it is provided that the control and supply lines of the access run through the feed unit which connects the access to the base module of the production robot. Accordingly, the electrical control and supply lines of the feed unit pass through the base module. Overall, the respective control and supply lines for the access, the feed unit and the production robots run to the control cabinet where they are centrally brought together. An energy bridge is not required. In this context, the term control and supply lines also includes all cables for sensors. The term control and supply line is not limited to electrical lines, but includes also hydraulic or pneumatic lines. In the context of the invention, the function of the individual supply or control line is not as important as that the disassembly effort and the assembly costs are kept to a minimum. Although the work cell of the invention is not as highly modular as embodiments described in the prior art, its basic configuration can be disassembled and assembled much faster and with less complexity. In addition, errors during assembly are avoided because there are fewer possibilities for errors.

In particular, the transport assembly is configured to fit inside a 20 foot container. The width of the transport assembly can be limited, for example, to 2280 mm and the height to 2350 mm. The fully assembled work cell with the outer walls has larger dimensions, e.g. a width of for example 3600 mm and at length of for example 4700 mm.

It is considered to be particularly advantageous that the transport assembly has a supporting frame, which is arranged on the bottom side of the transport assembly. The supporting frame interconnects all components of the transport assembly. The frame thus extends from the at least one base module of the at least one working robot via the feed unit to the access. The frame can in particular be formed by two parallel beams, between or on which the at least one base module and the feeder are arranged. The control cabinet may be mounted on one end of the frame, and the access may be mounted on the other end of the frame.

The entire work cell may be positioned on the bottom side by way of this frame. The frame defines exact distances between all components of the transport assembly, which are arranged at or on this frame. Neither re-adjustment nor rewiring is required. The frame protects the electrical control and supply lines between the control cabinet and the individual components of the transport assembly. Additional connectors and sources that may cause errors during assembly and disassembly are thus eliminated. The entire work cell can be aligned and its height adjusted via the frame, and ultimately anchored in relation to the base. The base frame is also the load-bearing component of the work cell, via which the transport assembly can be lifted and transported. The bottom frame can be stiffened by additional cross braces. Advantageously, the base module and a supporting structure of the feed unit form the cross braces of the frame. Likewise, end-side cross braces of the frame are formed by the access on the one end and/or by the control cabinet on the other end. This creates a stiffened, grid-like structure of a base frame. The access may also be pivotally connected to the supporting frame. Its top edge can then be lowered from an upright operating position into a transport position of lesser height. This does not enlarge the base area for transport, because the access can be pivoted in the direction of the feed unit. Pivoting does not require separation of the electrical connections between the frame and the access, because the access remains connected to the frame. The transport height can already be reduced from an initial height of 2700 mm to 2350 mm by pivoting, for example, by approximately 35°. This is sufficient for transport in a container.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
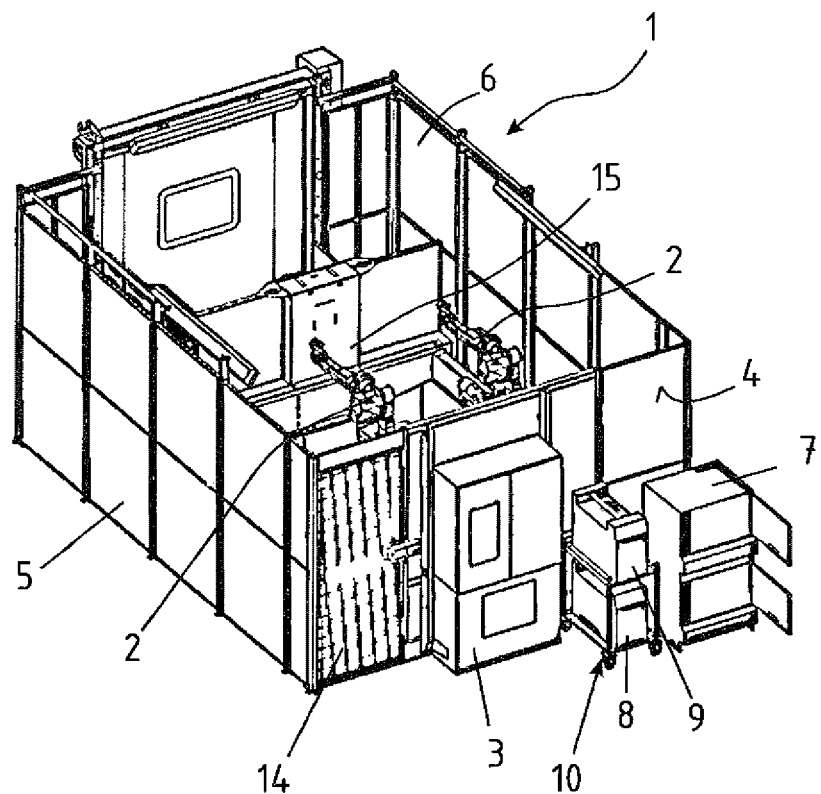
FIG. 1 is a first perspective view of a work cell.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a work cell 1 with two production robots 2 embodied as welding robots. Thus, the work cell 1 is a welding cell. The production robots 2 are identically configured. They are located next to each other in one half of the working cell 1 having a rectangular cross-section. FIG. 1 shows a control cabinet 3 disposed on a narrower side 4 of the rectangular work cell 1. The control cabinet 3 is located adjacent to wall elements 5, 6, which are each arranged in the region of the longer sides of the work cell 1 and delimit the work cell 1. The control cabinet 3 is the electrical interface between the exterior of the work cell 1 and the interior of the work cell 1. Furthermore, a control unit 7 in form of a robot control cabinet is visible in FIG. 1, which is located outside the work cell 1 in the vicinity of the control cabinet 3. Two welding current sources 8, 9 are arranged between the control unit 7 and the control cabinet. They are connected to the control cabinet 3. They are arranged one above the other and form a welding power source module 10, which is coupled to the control cabinet 3 via unillustrated plug-in connections.

Figure 2:
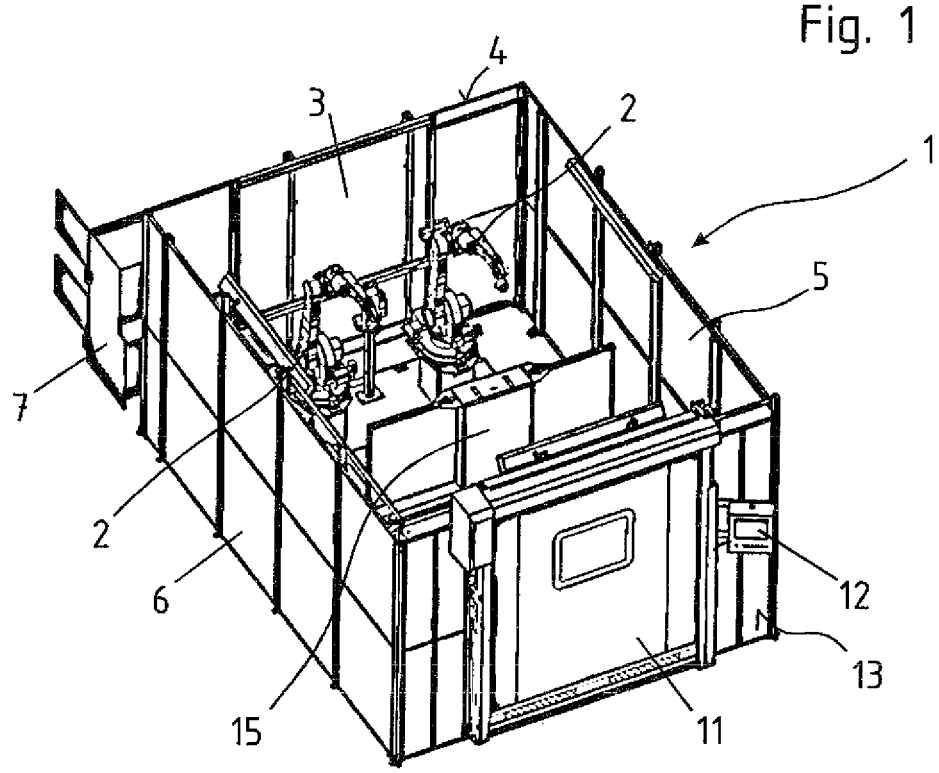
FIG. 2 is a second perspective view of the work cell of FIG. 1.

FIG. 2 shows the work cell 1 of FIG. 1 obliquely from above from the opposite perspective. An access 11 in the form of a roll-up door is visible on the opposite side with respect to the control cabinet 3. A display unit 12 is disposed next to the roll-up door 11. The access 11 is located on a narrow side 13 of the work cell 1 having a rectangular layout. The wall elements 5, 6, which delimit the longer sides of the work cell 1, engage in this case also partially around the corner of the work cell 1 and extend to the access 11. In addition, they extend to the control cabinet 3 on the opposite side 4, forming a complete enclosure. The work cell 1 can be entered via a door 14 (service door), which is located on the narrow side 4 next to the control cabinet 3, whereas the access 11 is provided only for inserting/removing the workpieces and can also be referred to as an operator work area. When necessary, the production robots 2 adjacent to the door 14 can be reached by way of the door 14. A turntable 15 is located in the center region of the work cell 1.

Figure 3:
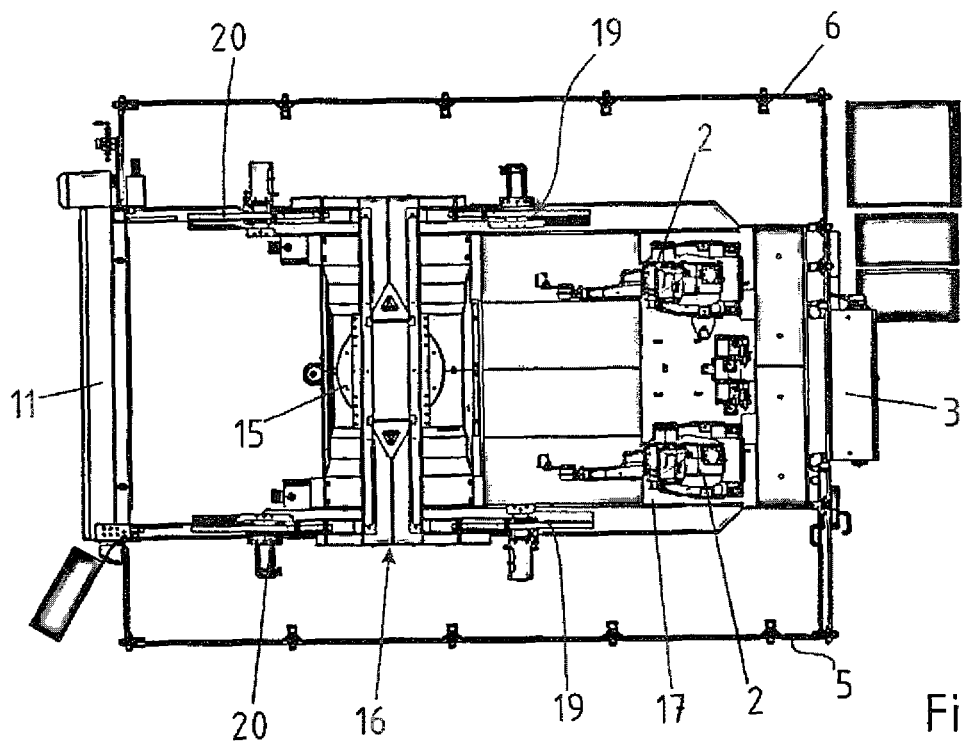
FIG. 3 shows the work cell of FIG. 1 in a plan view.
Figure 4:
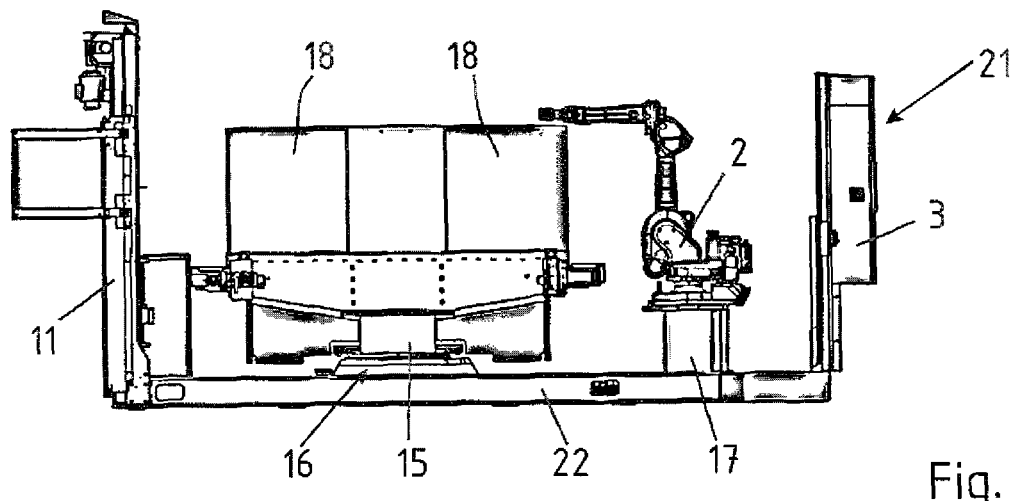
FIG. 4 shows the work cell of FIG. 2 in a side view with rotated turntable for transport.
Figure 5:
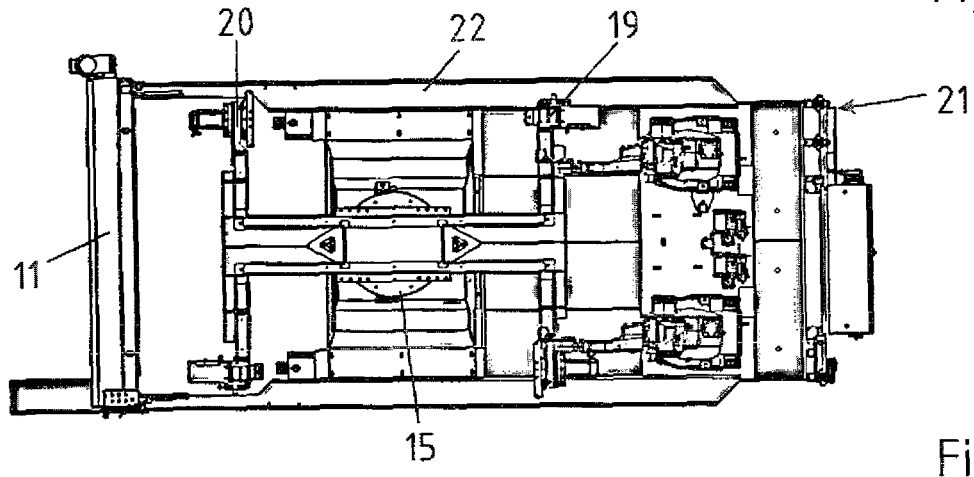
FIG. 5 shows the work cell of FIG. 4 in a plan view.

The turntable 15 is part of a feed unit 16 which extends between the access 11 and a base module 17 of the production robots 2 (FIGS. 3 to 5). The feed unit 16 therefore occupies the largest space inside the work cell 1, which is also due to the necessary space for the rotational movement of the turntable 15. In the exemplary embodiment of the invention, the turntable 15 has partition walls 18 (FIG. 4) and fork-shaped workpiece holders 19, 20 on each side of the partition wall 18.

FIGS. 4 and 5 show, after removal of the wall elements 5, 6 (FIG. 3), a continuous and electrically interconnected transport assembly 21, which is arranged on a frame 22. This frame 22 extends from the access 11 on the left side of the image plane to the control cabinet 3 on the right side of the image plane. The frame 22 supports both the production robot 2 with its base module 17 and the turntable 15 of the feed unit 16.

FIG. 5 shows the transport assembly 21 in a plan view. For the purpose of transport, the turntable 15 is in a position in which the fork-shaped tool holders 19, 20 do not project longitudinally beyond the frame 22. As a result, the work cell 1 fits without the side walls 5, 6 in a 20-foot container. The transport assembly 21 does not need to be further disassembled. In particular, the components of the transport assembly 21 remain electrically interconnected. An essential part of the invention is therefore the frame 22, which extends longitudinally from the base modules 17 of the production robots 2 via the feed unit 16 to the access 11. Moreover, the control cabinet 3 is also fixed in place and supported via the frame 22.

Figure 6:
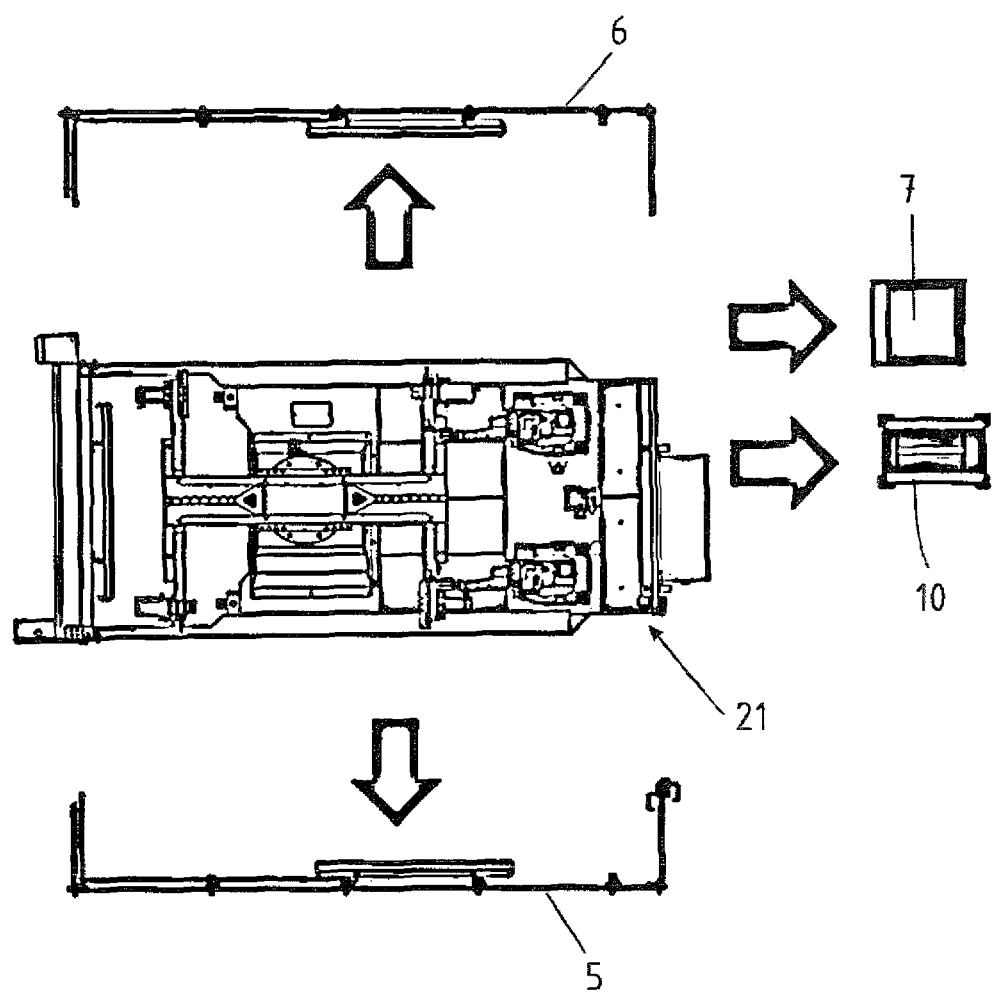
FIG. 6 shows the work cell of FIG. 1 in the disassembled state.

FIG. 6 illustrates that the effort for disassembling a work cell 1 is exceptionally low. For disassembly, only the side walls 5, 6 are separated from the central transport assembly 21, as shown in FIGS. 4 and 5, which can be easily detached mechanically. In addition, the control unit 7 that is arranged outside the work cell is disconnected from the transport assembly 21 as well as the welding power source module 10, which can be transported separately.

It can be seen that disassembly takes much less time than it would otherwise take to separate the central transport assembly 21 into its individual parts, in particular to mechanically and electrically separate the access 11 from the feed unit 16 and of the production robots 2. Even if mechanical separation were easily possible, careful checks of all electrical connections are required for recommissioning. Although the work cell 1 according to the invention also requires testing, the risks for errors and total failures are lower. The work cell 1 can be quickly recommissioned.

Figure 7:
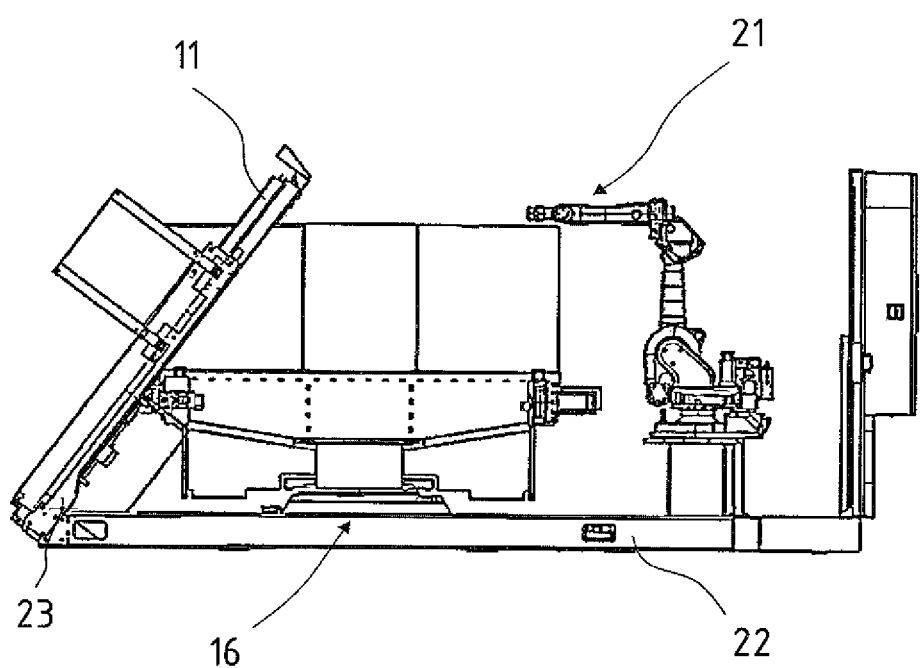
FIG. 7 shows the transport assembly of FIG. 6 with folded down access in a side view.

FIG. 7 shows the transport assembly 21 in a side view. In contrast to the FIG. 6, the access 11 is not oriented vertically, as it is necessary for the operation (operating position), but at an angle. The access 11 is here in a transport position. The access 11 is pivoted from the vertical in the direction of the feed unit 16 by approximately 35° and overlaps the feed unit 16 on the upper side and partly also on the longitudinal side. The overlapping components are the frame of the access 11, while the access 11 is otherwise open, thereby enabling the modules of the access 11 and the feed unit 16 to mesh with minimum installation space. A pivot axis 23, about which the access 11 can be pivoted, is located directly above the frame 22 or its longitudinal members, respectively, with which the access 11 is screwed together in the operating position.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A modular work cell for a production robot, comprising:
   at least one base module on which at least one production robot is arranged, the at least one base module disposed inside the modular work cell,
   wall elements that are mechanically attached for operation of the modular work cell and are mechanically detached for transport of the modular work cell,
   a control cabinet,
   a supporting frame,
   a feed unit for workpieces, and
   an access connected to the supporting frame, the access able to pivot between an upright vertical operating position and a transport position, the access lowered from the upright vertical operating position in a direction towards and overlapping the feed unit to the transport position for transport,
   wherein the feed unit is arranged between the access and the at least one production robot,
   wherein the at least one base module, the control cabinet, the feed unit and the access form a mechanically and electrically interconnected transport assembly with the supporting frame arranged on a bottom side of the transport assembly configured for transport, and
   wherein the wall elements are transported separate from the transport assembly.

2. The modular work cell of claim 1, wherein the at least one production robot is a welding robot.

3. The modular work cell of claim 2, comprising a plurality of welding robots and a plurality of welding power sources which are combined to form a welding power source module, wherein the welding power source module is coupled with the transport assembly via plug connections.

4. The modular work cell of claim 1, wherein electrical connections between the at least one base module, the control cabinet, the feed unit and the access remain interconnected during transport.

5. The modular work cell of claim 1, further comprising at least one control unit for the at least one production robot, wherein the at least one control unit is arranged outside the modular work cell and can be decoupled from the transport assembly for transport.

6. The modular work cell of claim 1, wherein the feed unit comprises a turntable.

7. The modular work cell of claim 6, wherein electrical control and supply lines for the access extend through the feed unit.

8. The modular work cell of claim 7, wherein control and supply lines for the access, for the feed unit and for the at least one production robot are brought together in the control cabinet.

9. The modular work cell of claim 1, wherein electrical control and supply lines for the feed unit extend through the at least one base module.

10. The modular work cell of claim 1, characterized in that the control cabinet is arranged on a first side of the modular work cell and the access is arranged on a second opposing side of the modular work cell, with the wall elements bridging an area between the first and the second side.

11. The modular work cell of claim 1, wherein the supporting frame extends from the at least one base module via the feed unit to the access.

12. The modular work cell of claim 1, wherein the supporting frame comprises two mutually parallel supports, between which the at least one base module and the feed unit are arranged.

13. The modular work cell of claim 1, wherein in the transport position, the access overlaps the feed unit on an upper side of the feed unit and on a longitudinal side of the feed unit.

14. The modular work cell of claim 13, wherein in the transport position, the access is pivoted approximately 35 degrees from the upright vertical position in the direction towards the feed unit.

15. The modular work cell of claim 13, wherein in the transport position, the access is open and meshes with the feed unit.

16. The modular work cell of claim 13, wherein in the transport position, a top edge of the access is lower than when the access is in the upright vertical operating position.

\* \* \* \* \*